(12) United States Patent
Bogoni et al.

(10) Patent No.: US 7,912,294 B2
(45) Date of Patent: Mar. 22, 2011

(54) SYSTEM AND METHOD FOR TOBOGGAN-BASED OBJECT DETECTION IN CUTTING PLANES

(75) Inventors: Luca Bogoni, Philadelphia, PA (US); Jianming Liang, Paoli, PA (US); Pascal Cathier, Bures (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1336 days.

(21) Appl. No.: 11/440,780

(22) Filed: May 25, 2006

(65) Prior Publication Data

US 2007/0036406 A1 Feb. 15, 2007

Related U.S. Application Data (60) Provisional application No. 60/685,512, filed on May 27, 2005.

(51) Int. Cl.
G06K 9/46 (2006.01)
G06K 9/00 (2006.01)

(52) U.S. Cl. .................................... 382/195; 382/131

(58) Field of Classification Search ............. 382/195
See application file for complete search history.

(56) References Cited

U.S. PATENT DOCUMENTS

| | | | |
|---|---|---|---|
| 6,169,817 B1 * | 1/2001 | Parker et al. | 382/131 |
| 2002/0164060 A1 * | 11/2002 | Paik et al. | 382/128 |
| 2004/0141638 A1 * | 7/2004 | Acar et al. | 382/131 |
| 2005/0078859 A1 | 4/2005 | Cathier | |
| 2005/0141765 A1 | 6/2005 | Liang et al. | |
| 2005/0185838 A1 | 8/2005 | Bogoni et al. | |
| 2005/0265601 A1 | 12/2005 | Cathier et al. | |
| 2005/0271276 A1 | 12/2005 | Liang et al. | |
| 2005/0271278 A1 | 12/2005 | Liang et al. | |
| 2006/0018549 A1 | 1/2006 | Liang et al. | |

OTHER PUBLICATIONS

Toboggan contrast enhancement for contrast segmentation, Fairfield, Pattern Recognition, 1990, 10th International Conference on Proceedings, vol. I, pp. 712-716.*
Toboggan-Based Intelligent Scissors with a Four-Parameter Edge Model, Mortensen et al., Computer Vision and Pattern Recognition, 1999. IEEE Computer Society Conference on, vol. 2, pp. 452-458.*
Fast image segmentation by sliding in the derivative terrain, Yao et al., SPIE vol. 1607 Intelligent Robots and Computer Visions X: Algorithms and Techniques, 1991, pp. 369-379.*

* cited by examiner

Primary Examiner — David P Rashid
(74) Attorney, Agent, or Firm — Peter Withstandley (57) ABSTRACT

A system and method for toboggan-based object detection in cutting planes are provided. A method for detecting an object in an image includes: determining a region of interest (ROI) in the image; determining a toboggan potential for each image element in the ROI; extracting a plurality of cutting planes from the ROI; and performing a tobogganing in the cutting planes to form a toboggan cluster to determine a location of the object, wherein image elements inside the toboggan cluster are stored in a cluster-member list, image elements on an outer-border of the toboggan cluster are stored in an outer-border list and image elements on an inner-border of the toboggan cluster are stored in an inner-border list.

12 Claims, 8 Drawing Sheets

PRIOR ART

SYSTEM AND METHOD FOR TOBOGGAN-BASED OBJECT DETECTION IN CUTTING PLANES

CROSS-REFERENCE TO RELATED APPLICATION

This application claims the benefit of U.S. Provisional Application No. 60/685,512, filed May 27, 2005, a copy of which is herein incorporated by reference.

BACKGROUND OF THE INVENTION

1. Technical Field

The present invention relates to medical image analysis, and more particularly, to a system and method for toboggan-based object detection in cutting planes.

2. Discussion of the Related Art

In the field of medical imaging, various modalities have been developed for generating medical images of anatomical structures for the purposes of screening and evaluating medical conditions. Exemplary modalities include, computed tomography (CT), magnetic resonance (MR), positron emission tomography (PET), ultrasound (US), etc. Each modality provides unique advantages for screening and evaluating certain types of diseases or medical conditions such as colonic polyps, aneurysms, lung nodules, calcification on heart or artery tissue, cancer micro-calcifications, masses in breast tissue, etc.

For example, a CT imaging modality can be used to obtain a set of cross-sectional images or 2D slices of a region or interest (ROI) of a patient for purposes of imaging organs and other anatomies. The CT modality is generally employed for purposes of diagnosing disease because it provides precise images that illustrate the size, shape, and location of various anatomical structures such as organs, soft tissues and bones, and because it enables a more accurate evaluation of lesions and abnormal anatomical structures such as cancer, polyps, etc. One technique for characterizing shapes and segmenting objects generated by CT, MR, PET, US, etc. is known as tobogganing.

Tobogganing is a non-iterative, single-parameter, linear execution time over-segmentation method. It is non-iterative in that it processes each image pixel/voxel only once, thus accounting for the linear execution time. The sole input is an image's discontinuity or local contrast measure, which is used to determine a slide direction at each pixel. However, such a measure does not work in the context of polyp detection from CT image data. To overcome this, a technique for using a toboggan potential to determine a slide direction at each pixel/voxel was developed. Here, the toboggan potential is computed from the original image, in 2D, 3D or higher dimensions, and the potential depends on the application and the objects to be segmented.

In a conventional tobogganing, an entire set of image data is scanned to determine toboggan clusters. However, since locations of objects such as polyps are known in many applications, it is unnecessary to process the entire set of image data. Accordingly, a fast tobogganing algorithm was developed, which starts from a specified location, quickly forms a toboggan cluster locally without involving any pixels/voxels beyond an outer boundary of the toboggan cluster and dynamically and selectively computes its potential when necessary. An example of the conventional tobogganing process and the fast tobogganing process is shown in FIG. 1.

Figure 1:
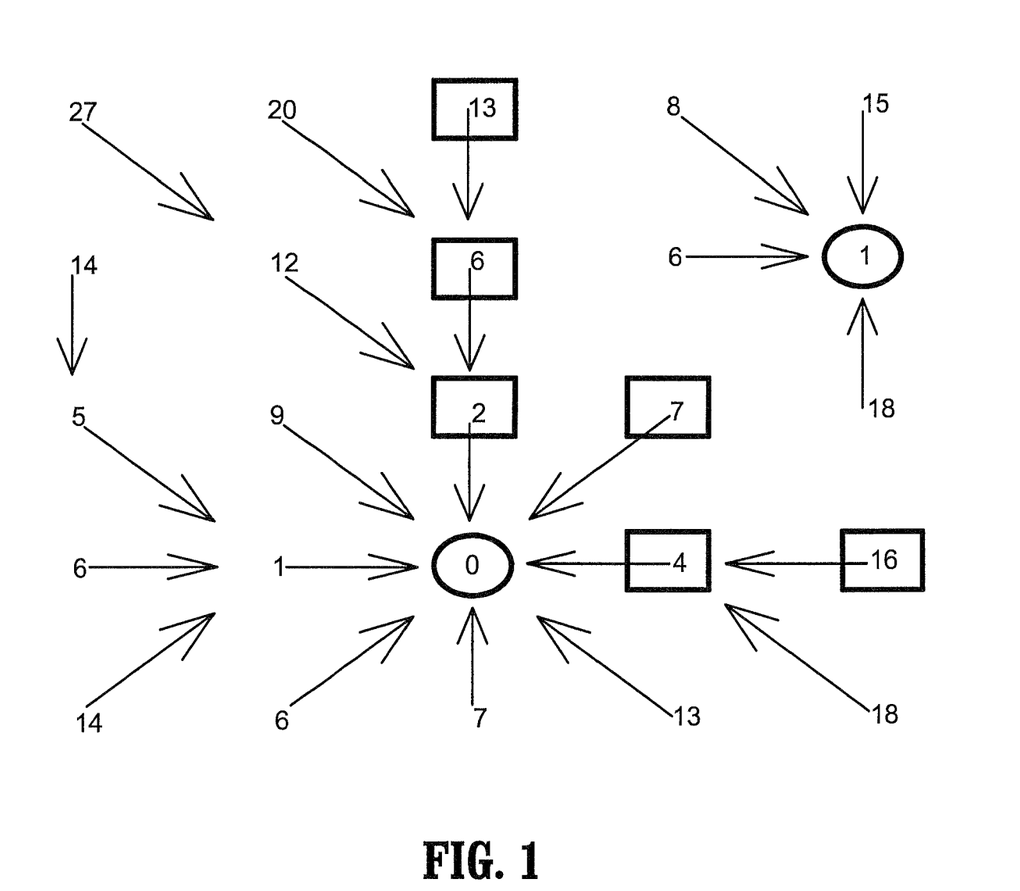
FIG. 1 is a diagram illustrating a conventional tobogganing process and a fast tobogganing process.

In FIG. 1, a 5×5 toboggan potential map in 2D is shown. Here, numbers represent potential values at each pixel in an ROI. As shown in the map, each pixel slides to its neighbor having a minimal potential value, and then, the pixels slide to two concentration locations, indicated by circles 0 and 1, thereby forming two toboggan clusters. In the conventional tobogganing process, the entire image is scanned to determine the toboggan clusters; however, in the fast tobogganing process, the tobogganing starts from an initial location and a toboggan cluster is formed without involving any pixels/voxels beyond an outer boundary. For example, in FIG. 1, if a pixel with a potential of 8 is selected as an initial location, a cluster concentrated at circle 1 will be formed. The cluster will include only the pixels 8, 6, 18 and 15, thus resulting in a more efficient process.

Automatic object detection algorithms are generally used to help physicians detect spherical and ellipsoidal structures in a large set of image slices by simplifying a complex 3D detection into a simpler 2D detection. This is accomplished by dividing a 3D image into a number of 2D planes, and then, detecting circular structures or bumps in the 2D planes, which are oriented in a number of directions that span an entire image. Information collected from the planes is then combined into a 3D rendering. However, the circular structures are not always separated from other objects by performing a simple or adaptive thresholding. To this end, a watershed segmentation was developed to separate ROIs. However, watershed segmentation algorithms process most of the pixels/voxels in all of the 2D cutting planes in all orientations, thereby causing a computational bottleneck.

Accordingly, there is a need for a segmentation technique that accurately identifies spherical or ellipsoidal structures in a large set of image slices while reducing computational complexity.

SUMMARY OF THE INVENTION

In one embodiment of the present invention, a method for detecting an object in an image comprises: determining a region of interest (ROI) in the image; determining a toboggan potential for each image element in the ROI; extracting a plurality of cutting planes from the ROI; and performing a tobogganing in the cutting planes to form a toboggan cluster to determine a location of the object, wherein image elements inside the toboggan cluster are stored in a cluster-member list, image elements on an outer-border of the toboggan cluster are stored in an outer-border list and image elements on an inner-border of the toboggan cluster are stored in an inner-border list.

The ROI is an organ or part of an organ including a spherical or ellipsoidal object. The cutting planes are 2D slices of the ROI.

The tobogganing comprises: (a) determining a concentration location, wherein if the concentration location is in the ROI, the tobogganing comprises: (b) adding the concentration location to the cluster-member list and adding neighbor image elements of the concentration location to an active-elements list; (c) selecting an image element with a minimum or maximum toboggan potential as a current image element; (d) determining a sliding direction of the current image element; (e) if the current image element slides to an image element in the cluster-member list, adding the current image element to the cluster-member list and adding neighbor image elements of the current image element to the active-elements list if the neighbor image elements of the current image element are not already in the active-elements list; (f) if the current image element does not slide to an image element in the cluster-member list, adding the current image element to the outer-border list and adding neighbor image elements of the current image element in the cluster-member list to the inner-border list; (g) repeating steps (c-f) until the active-elements list is empty, wherein the toboggan cluster includes image elements in the cluster-member list and inner-border list.

The method further comprises: extracting a property of the object in the cutting planes using the image elements stored in the outer-border and inner-border lists; and identifying whether the object is a non-malignant growth or tumor based on the extracted property.

In another embodiment of the present invention, a method for automatically forming a toboggan cluster having an outer-border and inner-border in a 2D cutting plane comprises: (a) determining a concentration location, wherein if the concentration location is in a region of interest (ROI), the tobogganing comprises; (b) adding the concentration location to a cluster-member list and adding neighbor image elements of the concentration location to an active-elements list; (c) selecting an image element with an extremal toboggan potential as a current image element; (d) determining a sliding direction of the current image element; (e) if the current image element slides to an image element in the cluster-member list, adding the current image element to the cluster-member list and adding neighbor image elements of the current image element to the active-elements list if the neighbor image elements of the current image element are not already in the active-elements list; (f) if the current image element does not slide to an image element in the cluster-member list, adding the current image element to an outer-border list and adding neighbor image elements of the current image element in the cluster-member list to an inner-border list; (g) repeating steps (c-f) until the active-elements list is empty, wherein the toboggan cluster includes image elements in the cluster-member list and inner-border list.

If the concentration location is not in the ROI, the tobogganing further comprises (h) repeating step (a) until a concentration location in the ROI is found.

The image elements are pixels or voxels. The outer- and inner-borders are automatically formed using the image elements in the outer-border list and the inner-border list. The extremal toboggan potential is a minimum or maximum toboggan potential.

In yet another embodiment of the present invention, a method for identifying an object in a computed tomography (CT) image of a colon comprises determining a region of interest (ROI) in the image; determining a toboggan potential for each image element in the ROI; extracting a plurality of 2D cutting planes from the ROI; and performing a tobogganing in the cutting planes to form a toboggan cluster to identify the object, wherein if the concentration location is in the ROI, the tobogganing comprises: finding a concentration point in the cutting planes; and expanding from the concentration point by including neighbor image elements of the concentration point in a cluster based on the potentials of the image elements, wherein image elements inside the cluster are stored in a cluster-member list, image elements on an outer-border of the cluster are stored in an outer-border list and image elements on an inner-border of the cluster are stored in an inner-border list.

The ROI is a colon wall. The ROI is determined by thresholding the image to obtain an air region, dilating the air region and subtracting the air region from the dilated air region. The toboggan potential for each image element in the ROI is acquired when the CT image data is acquired. Thirteen cutting planes are extracted from the ROI.

Finding a concentration point comprises: (a) selecting a point in the image; (b) finding a neighbor with a maximum or minimum potential with respect to the selected point; (c) sliding to the neighbor point; and repeating steps (a-c) until a point is reached that cannot slide to a neighbor point.

The method further comprises: extracting a property of the object in the cutting planes, wherein the property is a circularity measure calculated using the image elements stored in the cluster-member, outer-border and inner-border lists; and identifying whether the object is a polyp based on the circularity measure.

In another embodiment of the present invention, a system for detecting an object in an image comprises: a memory device for storing a program; a processor in communication with the memory device, the processor operative with the program to: determine a region of interest (ROI) in the image; determine a toboggan potential for each image element in the ROI; extract a plurality of cutting planes from the ROI; and perform a tobogganing in the cutting planes to form a toboggan cluster to determine a location of the object, wherein image elements inside the toboggan cluster are stored in a cluster-member list, image elements on an outer-border of the toboggan cluster are stored in an outer-border list and image elements on an inner-border of the toboggan cluster are stored in an inner-border list.

The processor is further operative with the program code to: extract a property of the object in the cutting planes using the image elements stored in the outer-border and inner-border lists; and identify whether the object is a non-malignant growth or tumor based on the extracted property.

The image is acquired using a CT, positron emission tomography (PET), single photon emission computed tomography (SPECT), magnetic resonance (MR), fluoroscopic, x-ray or ultrasound device.

In yet another embodiment of the present invention, a system for automatically forming a toboggan cluster having an outer-border and inner-border in a 2D cutting plane comprises: a memory device for storing a program; a processor in communication with the memory device, the processor operative with the program to: (a) determine a concentration location, wherein if the concentration location is in a region of interest (ROI), the processor is further operative with the program code when tobogganing to: (b) add the concentration location to a cluster-member list and add neighbor image elements of the concentration location to an active-elements list; (c) select an image element with a minimum or maximum toboggan potential as a current image element; (d) determine a sliding direction of the current image element; (e) add the current image element to the cluster-member list and add neighbor image elements of the current image element to the active-elements list if the neighbor image elements of the current image element are not already in the active-elements list when the current image element slides to an image element in the cluster-member list; (f) add the current image element to an outer-border list and add neighbor image elements of the current image element in the cluster-member list to an inner-border list when the current image element does not slide to an image element in the cluster-member list; (g) repeat (c-f) until the active-elements list is empty, wherein the toboggan cluster includes image elements in the cluster-member list and inner-border list.

If the concentration location is not in the ROI, the processor is further operative with the program code to: (h) repeat (a) until a concentration location in the ROI is found.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 2:
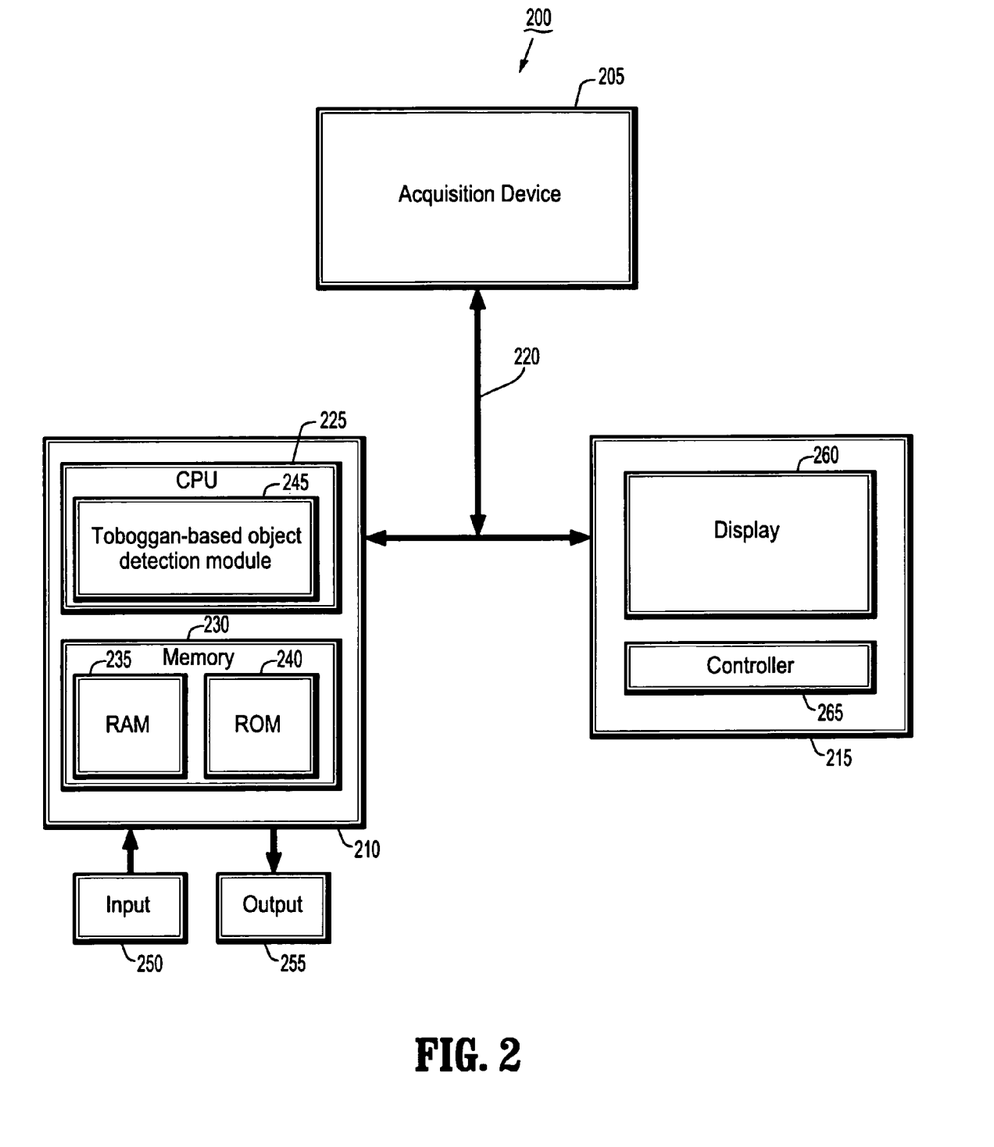
FIG. 2 is a block diagram illustrating a system for toboggan-based object detection in cutting planes according to an exemplary embodiment of the present invention.

FIG. 2 is a block diagram illustrating a system 200 for toboggan-based object detection in cutting planes according to an embodiment of the present invention. As shown in FIG. 2, the system 200 includes an acquisition device 205, a PC 210 and an operator's console 215 connected over a wired or wireless network 220.

The acquisition device 205 may be a magnetic resonance (MR) imaging device, computed tomography (CT) imaging device, helical CT device, positron emission tomography (PET) device, single photon emission computed tomography (SPECT) device, hybrid PET-CT device, hybrid SPECT-CT device, 2D or 3D fluoroscopic imaging device, 2D, 3D, or 4D ultrasound (US) imaging device, or an x-ray device. In addition, the acquisition device may be a multi-modal or hybrid acquisition device that is capable of acquiring images, for example, in a PET mode, SPECT mode or MR mode.

The PC 210, which may be a portable or laptop computer, a medical diagnostic imaging system or a picture archiving communications system (PACS) data management station, includes a CPU 225 and a memory 230 connected to an input device 250 and an output device 255. The CPU 225 includes a toboggan-based object detection module 245 that includes one or more methods for performing toboggan-based object detection in cutting planes to be discussed hereinafter with reference to FIGS. 3-8. Although shown inside the CPU 225, the toboggan-based object detection module 245 can be located outside the CPU 225.

The memory 230 includes a RAM 235 and a ROM 240. The memory 230 can also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The input 250 is constituted by a keyboard, mouse, etc., and the output 255 is constituted by an LCD, CRT display, or printer.

The operation of the system 200 may be controlled from the operator's console 215, which includes a controller 265, for example, a keyboard, and a display 260. The operator's console 215 communicates with the PC 210 and the acquisition device 205 so that image data collected by the acquisition device 205 can be rendered by the PC 210 and viewed on the display 260. It is to be understood that the PC 210 can be configured to operate and display information provided by the acquisition device 205 absent the operator's console 215, using, for example, the input 250 and output 255 devices to execute certain tasks performed by the controller 265 and display 260.

The operator's console 215 may further include any suitable image rendering system/tool/application that can process digital image data of an acquired image dataset (or portion thereof) to generate and display images on the display 260. More specifically, the image rendering system may be an application that provides rendering and visualization of medical image data, and which executes on a general purpose or specific computer workstation. It is to be understood that the PC 210 can also include the above-mentioned image rendering system/tool/application.

Figure 3:
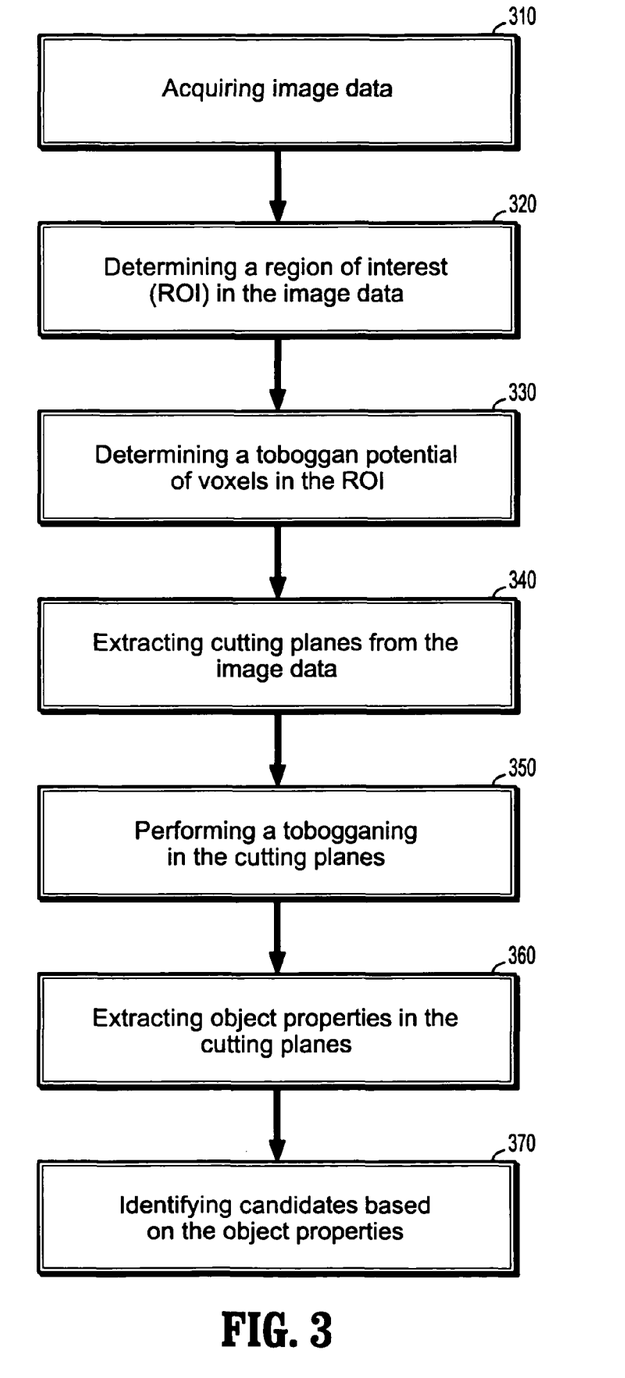
FIG. 3 is a flowchart illustrating a method for toboggan-based object detection in cutting planes according to an exemplary embodiment of the present invention.

FIG. 3 is a flowchart illustrating a method for toboggan-based object detection in cutting planes according to an embodiment of the present invention. As shown in FIG. 3, image data of a colon is acquired from a patient (310). This is accomplished by using the acquisition device 205, in this example a CT scanner, which is operated at the operator's console 215, to scan, for example, a patient's abdomen thereby generating a series of 2D image slices associated with the abdomen. The 2D image slices are then combined to form a 3D image of the colon.

Although image data of the colon is acquired in this step, it is to be understood that image data of a desired organ such as the patient's brain, heart, lungs or liver may be acquired by scanning relevant portions of the patient's body such as their head, chest or abdomen. Further, the image data may be provided from a non-medical context such as, for example, remote sensing systems, electron microscopy, etc. The image data may also be acquired by using any one or a combination of the modalities described above for the acquisition device 205.

Since image data of the patient's colon has been acquired in step 310, the remaining discussion will focus on analyzing this data in the context of automatic polyp detection in the colon. It is to be understood, however, that the following discussion is not limited to automatic polyp detection in the colon. For example, if image data of a lung were acquired in step 310 the following discussion would be applicable to automatic detection of lesions or pulmonary emboli, etc.

Figure 4:
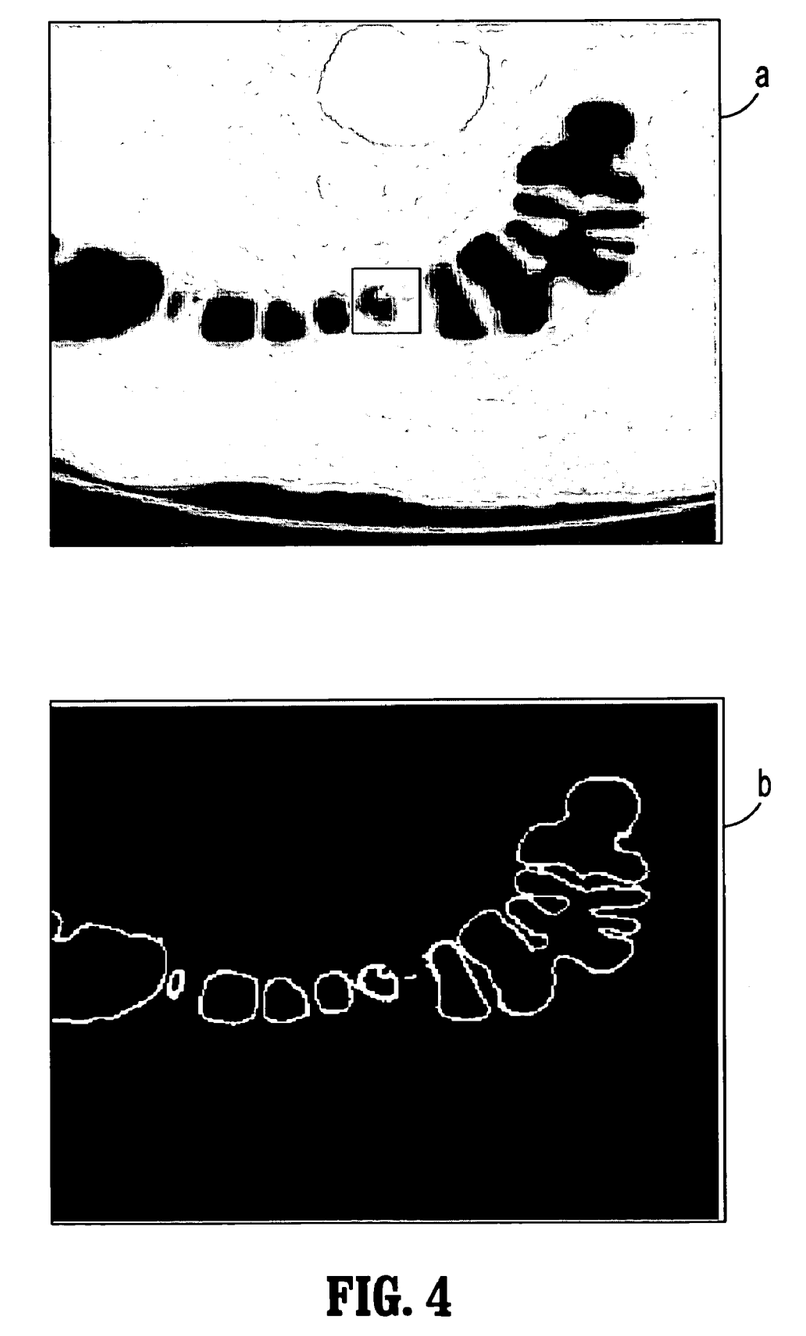
FIG. 4 is a pair of images illustrating a colon and an extracted colon wall.

Once the image data has been acquired, a region of interest (ROI) in the image data is determined (320). Here, since we are searching for polyps, a colon wall is extracted from the image data and regarded as the ROI. The colon wall may be extracted by a number of techniques. For example, the colon wall may be extracted by thresholding the image data to define an air region, dilating the air region, and then, subtracting the air region from the dilated air region to obtain the colon wall. FIG. 4 illustrates, in image (a), a colon, and in image (b), a colon wall that has been extracted therefrom. For presentation convenience, an area in image (a) that is identified by a rectangle, and its corresponding area in image (b) show a polyp that will be discussed hereinafter.

Now that the colon wall has been extracted, a toboggan potential for each voxel in the colon wall is determined (330). It is to be understood that a voxel will be discussed throughout the remainder of the specification. However, the following discussion is also applicable to a pixel.

Several methods for calculating the toboggan potential may be used in this step. These techniques include processing the image data using a smoothing filter, a smoothed gradient magnitude analysis, a colon wall segmentation with a smoothing operation and distance transform algorithms. In some applications, the original image data may be used directly for the toboggan potentials without any further image processing. However, image processing techniques such as smoothing the original image data and suppressing local maxima and pre-processing techniques such as isotropic interpolation may be performed to reduce the number of superficial toboggan clusters on the colon wall.

It is to be understood that the toboggan potential may be calculated using any of the techniques described in U.S. Patent Application Publication Nos. 20050141765 and 20050185838 both of which are assigned to the assignee of the present application. Copies of U.S. Patent Application Publication Nos. 20050141765 and 20050185838 are incorporated by reference herein in their entirety.

Figure 5:
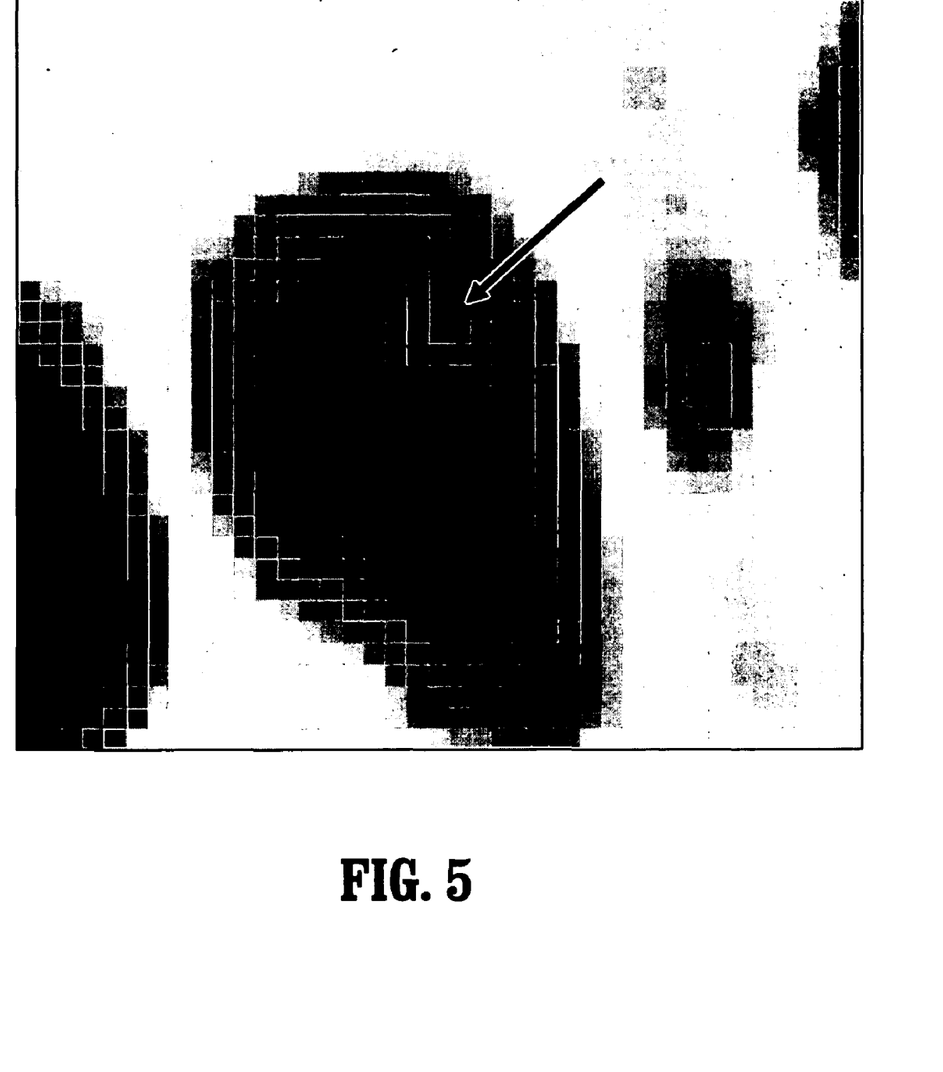
FIG. 5 is an image illustrating a cutting plane.

After determining the toboggan potentials, cutting planes are extracted from the image data (340). More specifically, for each voxel in a 3D volume representing the polyp, the volume is cut to form different planes having different orientations with respect to the axes of the image data, each centered on the voxel. Although there is no limitation on the number of cutting planes to be extracted, it has been found that 13 planes at unique orientations are sufficient. Further, it is to be understood that a voxel has 26 neighbors and a pixel has eight neighbors. FIG. 5 illustrates a cutting plane that has been extracted from the colon wall in image (b) of FIG. 4. Here, the polyp is indicated by an arrow.

It is to be understood that the cutting planes may be formed using any of the techniques described in U.S. Patent Application Publication Nos. 20050078859 and 20050265601 both of which are assigned to the assignee of the present application. Copies of U.S. Patent Application Publication Nos. 20050078859 and 20050265601 are incorporated by reference herein in their entirety.

Figure 6:
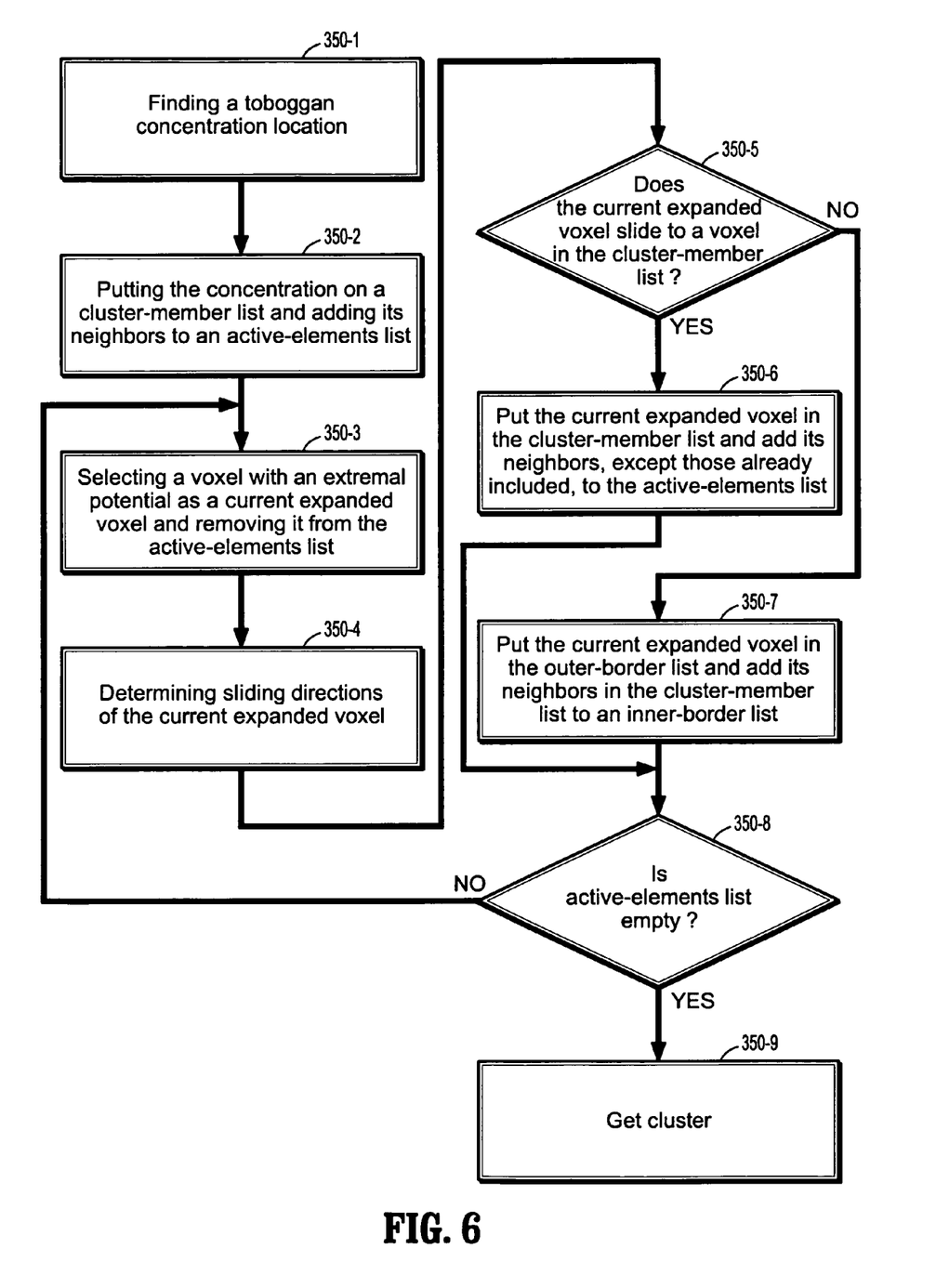
FIG. 6 is a flowchart illustrating a method for tobogganing according to an exemplary embodiment of the present invention.

To detect the polyp shown in FIG. 4, a tobogganing according to an embodiment of the invention is performed in the cutting planes (350). As shown in FIG. 6, a toboggan concentration location in the ROI is found (350-1). It is to be understood that if the toboggan concentration in not found in the ROI, the algorithm will move on to an unprocessed cite in the image until it finds a concentration in the ROI or until there are no unprocessed cites.

In step 350-1, a selected location, either provided by a user or automatically generated, which is hereinafter referred to as a current voxel, is slid to a neighbor with an extremal potential. The extrema can be either a maximum or a minimum depending upon the application. The process is repeated with each voxel neighbor such that when the neighbor is reached it becomes the current voxel to be slid until it reaches a concentration location. A concentration location is a voxel that cannot slide to any of its neighbors.

Next, the concentration location is expanded to form a toboggan cluster. This can be done in a number of ways. For example, toboggan cluster can be formed using the techniques described in U.S. Patent Application Publication No. 20050271278, which is assigned to the assignee of the present application. A copy of U.S. Patent Application Publication No. 20050271278 is incorporated by reference herein in its entirety.

According to the embodiment of the invention, the expansion can utilize two data structures. One is a cluster-member list, which includes all the voxels assigned to the cluster. The other is an active-elements list, which includes all the neighbors of the voxels in the cluster-member list. The active-elements list can be implemented in any manner that permits a quick search, such as a priority queue or an open list, so that a voxel with a maximal/minimal potential can be quickly found.

The expansion process can be described as a base step and an iterative step. In the base step, the concentration location is taken as the current expanded voxel, and is assigned a unique toboggan label (350-2). The cluster-member list is initialized with the concentration location and neighbors of the current expanded voxel are marked and inserted into the active elements list.

In the iterative step, the toboggan potential for a voxel with a minimal/maximal potential with respect to the current expanded voxel is selected and removed from the active-elements list (350-3). This removed voxel becomes the current expanded voxel. Next, sliding directions of the current expanded voxel are determined (350-4). If the current expanded voxel slides to a voxel in the cluster-member list (350-5), the current expanded voxel is put in the cluster-member list and its neighbors, except those already in the list, are added to the active-elements list (350-6).

If, however, the current expanded voxel does not slide to a voxel in the cluster-member list (350-5), the current expanded voxel is put in an outer-border list and its neighbors that are in the cluster-member list are put in an inner-border list (350-7). If the active-elements list is not empty (350-8), steps 350-3 through 350-7 are repeated for each voxel in the active-elements list that has an extremal potential with respect to the current expanded voxel. Upon finishing (350-9), the cluster-member list has all the voxels in the cluster and the outer-border and inner-border lists have all the outer and inner border voxels respectively. It is to be understood that the sliding direction can be recorded for each voxel in the cluster, outer-border and inner-border lists during the tobogganing process.

Figure 7:
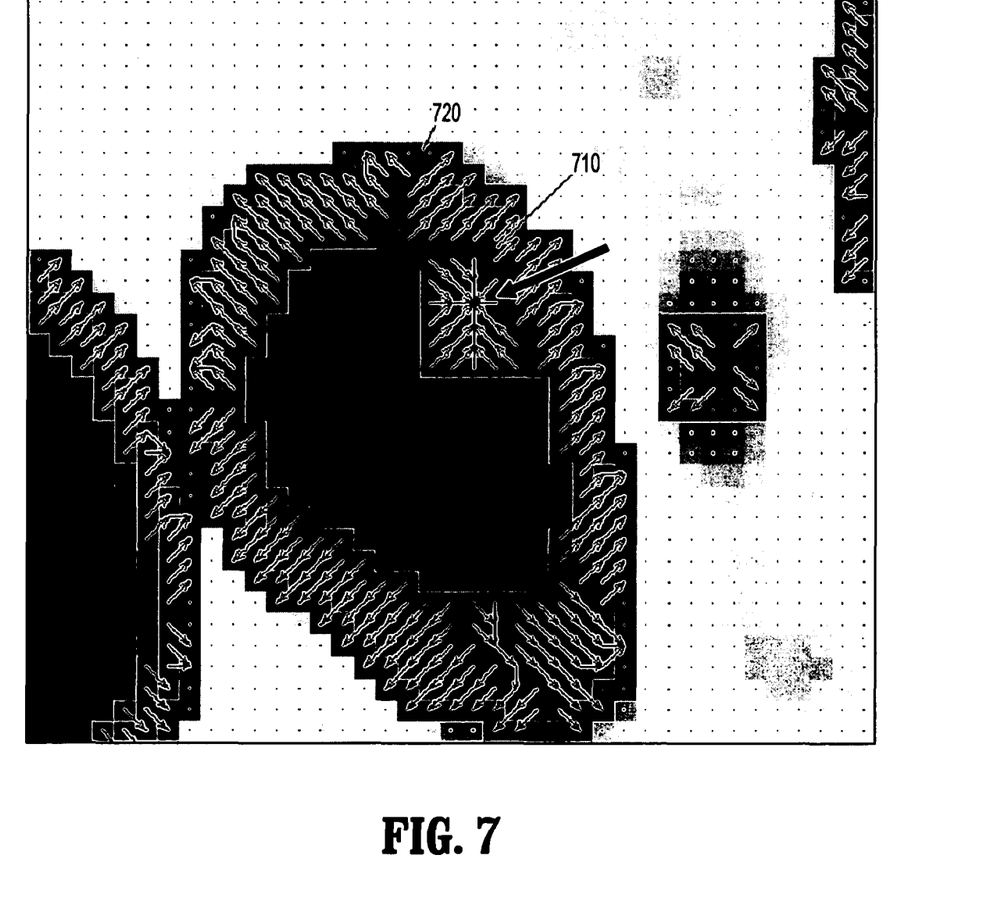
FIG. 7 is an image illustrating a-cluster formed by the tobogganing of FIG. 6.

An example of a cluster formed by the tobogganing is shown in FIG. 7. Here, a region 710 indicates the extracted colon wall. If a voxel toboggans to the outside of the extracted colon wall, in other words, if it slides to a region 720, no cluster is formed. However, if a voxel toboggans to a concentration location in the extracted colon wall, a cluster is formed. In FIG. 7, the cluster is indicated by a large arrow. Here, only toboggan clusters that concentrate in the ROI are collected.

Figure 8:
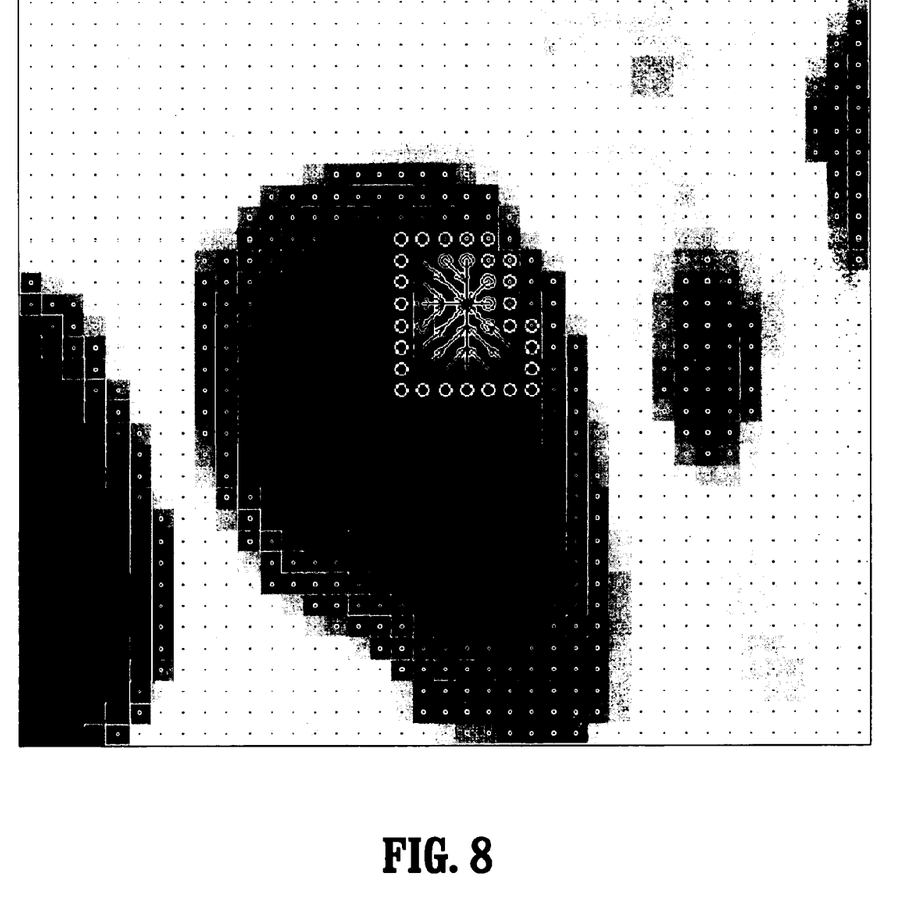
FIG. 8 is an image illustrating outer- and inner-border voxels of the cluster of FIG. 7.

Since the cluster has been formed by using the outer- and inner-border lists, in addition to the cluster-member and active-elements lists, the polyp achieves a good separation from its surroundings. For example, as shown in FIG. 8, the outer-border voxels, which are indicated by outer circles, and the inner-border voxels, which are indicated by inner circles, further isolate the polyp from its surroundings. In addition, since the outer- and inner-border voxels are readily available, a number of cluster properties can be calculated as will be discussed hereinafter with reference to step 360 of FIG. 3 and FIG. 8.

It is to be understood that some post-processing may be performed on the clusters prior to property calculation. For example, border voxels having maximum intensities that are not in a range of the object intensity can be suppressed. This technique could also remove some of the toboggan clusters. In addition, the border voxels can be analyzed for variation. Here, if there is a significant variation in the border, the cluster can be merged with a neighboring cluster, thus resulting in more consistency along the new border of the merged cluster. The clusters may also be merged using some of the techniques described in U.S. Patent Publication Nos. 20050141765, 20050185838 and 20050271276, a copy of which is incorporated by reference herein in its entirety. These techniques can be used to alleviate noise and image variation, thereby improving the quality of the clusters and the robustness of the properties to be computed in step 360.

Referring back to FIG. 3, once the clusters have been formed, object properties can be extracted (360). In the context of polyp detection, a search is performed to identify circular structures in the 2D cutting planes. To accomplish this, a number of properties of the clusters can be used to determine their circularity.

For example, using the outer- and inner-border lists, a perimeter p and a surrounding area a can be calculated for the cluster. This results in a circularity measure:

$$c = \frac{4\pi a}{p^2}.$$

However, to make the circularity measure more robust, the following formula can be used: $c'=\log_{10}(c)$. The circularity can also be based on eigenvalues resulting from a principle component analysis performed on all the voxels in the cluster $$c'' = \frac{e_1}{e_2},$$

where $e_1 \leq e_2$. A circularity measure based on the outer- and inner-borders of FIG. 8 was 0.017 for the outer-border and 0.045 for the inner border. A circularity measure based on eigenvalues in a principle component analysis was 0.68 in this case.

It is to be understood that additional properties of the cluster can be computed using a toboggan layer as disclosed in U.S. Patent Application Publication No. 20060018549, which is assigned to the assignee of the present application. A copy of U.S. Patent Application Publication No. 20060018549 is incorporated by reference herein in its entirety. Further, similar properties can be computed using the 3D coordinates of the clusters.

Once certain properties of the clusters have been extracted, polyp candidates can be identified (370). Here, by using the circularity measures, clusters can be selected as polyp candidates for further processing such as polyp feature extraction and classification. For example, by using a circularity threshold, if a cluster meets or exceeds the threshold it may be selected as a candidate. Further, the candidate selection could involve meeting or exceeding the threshold across a certain number of 2D cutting planes. In addition, the reported candidates may be cluster-based or position-based. Cluster-based candidates output the entire cluster as a candidate and position-based candidates find a point in the cluster and represent the point as the cluster. An exemplary position-based cluster may be the concentration location of the cluster. A morphological ultimate erosion may also be used to determine a representative point for a cluster.

In accordance with an exemplary embodiment of the present invention, a toboggan-based object detection in cutting planes may be efficiently performed. For example, by performing a tobogganing that is capable of automatically identifying outer- and inner-borders of a cluster in a 2D cutting-plane, a computationally extensive 3D detection becomes a less computationally extensive 2D detection. Further, the computed outer- and inner-borders enable properties of a detected object to be more accurately identified, thereby aiding a physician is their diagnosis of certain medical conditions.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A program storage device readable by a computer, tangibly embodying a program of instructions executable by the computer to perform method steps for detecting an object in a three-dimensional (3D) medical image, the method comprising the steps of:
    determining a region of interest (ROI) in the 3D medical image;
    determining a toboggan potential for each image element in the ROI;
    extracting a plurality of two-dimensional (2D) cutting planes from the ROI; and
    performing a tobogganing in the cutting planes to form a toboggan cluster to determine a location of the object,
    wherein image elements inside the toboggan cluster are stored in a cluster-member list, image elements on an outer-border of the toboggan cluster are stored in an outer-border list and image elements on an inner-border of the toboggan cluster are stored in an inner-border list
    wherein the step of tobogganing further comprises:
    (a) determining a concentration location, wherein if the concentration location is in the ROI, the tobogganing comprises:

(b) adding the concentration location to the cluster-member list and adding neighbor image elements of the concentration location to an active-elements list;
(c) selecting an image element with a minimum or maximum toboggan potential as a current image element;
(d) determining a sliding direction of the current image element;
(e) if the current image element slides to an image element in the cluster-member list, adding the current image element to the cluster-member list and adding neighbor image elements of the current image element to the active-elements list if the neighbor image elements of the current image element are not already in the active-elements list;
(f) if the current image element does not slide to an image element in the cluster-member list, adding the current image element to the outer-border list and adding neighbor image elements of the current image element in the cluster-member list to the inner-border list;
(g) repeating steps (c-f) until the active-elements list is empty,
wherein the toboggan cluster includes image elements in the cluster-member list and inner-border list.

2. The computer readable program storage device of claim 1, wherein the ROI is an organ or part of an organ including a spherical or ellipsoidal object.

3. The computer readable program storage device of claim 1, wherein the cutting planes are 2D slices of the ROI.

4. The computer readable program storage device of claim 1, further comprising:
extracting a property of the object in the cutting planes using the image elements stored in the outer-border and inner-border lists.

5. The computer readable program storage device of claim 4, further comprising:
identifying the object as a polyp candidate based on the extracted property.

6. A program storage device readable by a computer, tangibly embodying a program of instructions executable by the computer to perform method steps for identifying an object in a three-dimensional (3D) computed tomography (CT) image of a colon, the method comprising the steps of:
determining a region of interest (ROI) in the 3D image, wherein the ROI is determined by thresholding the image to obtain an air region, dilating the air region and subtracting the air region from the dilated air region;
determining a toboggan potential for each image element in the ROI;
extracting a plurality of 2D cutting planes from the ROI; and
performing a tobogganing in the cutting planes to form a toboggan cluster to identify the object, wherein if a concentration location is in the ROI, the tobogganing comprises:
finding a concentration point in the cutting planes; and
expanding from the concentration point by including neighbor image elements of the concentration point in a cluster based on the potentials of the image elements,
wherein image elements inside the cluster are stored in a cluster-member list, image elements on an outer-border of the cluster are stored in an outer-border list and image elements on an inner-border of the cluster are stored in an inner-border list.

7. The computer readable program storage device of claim 6, wherein the ROI is a colon wall.

8. The computer readable program storage device of claim 6, wherein the toboggan potential for each image element in the ROI is acquired when the CT image data is acquired.

9. The computer readable program storage device of claim 6, wherein 13 cutting planes are extracted from the ROI.

10. The computer readable program storage device of claim 6, wherein finding a concentration point comprises:
(a) selecting a point in the image;
(b) finding a neighbor with a maximum or minimum potential with respect to the selected point;
(c) sliding to the neighbor point; and
repeating steps (a-c) until a point is reached that cannot slide to a neighbor point.

11. A program storage device readable by a computer, tangibly embodying a program of instructions executable by the computer to perform method steps for identifying an object in a three-dimensional (3D) computed tomography (CT) image of a colon, the method comprising the steps of:
determining a region of interest (ROI) in the 3D image;
determining a toboggan potential for each image element in the ROI;
extracting a plurality of 2D cutting planes from the ROI; and
performing a tobogganing in the cutting planes to form a toboggan cluster to identify the object, wherein if a concentration location is in the ROI, the tobogganing comprises:
finding a concentration point in the cutting planes; and
expanding from the concentration point by including neighbor image elements of the concentration point in a cluster based on the potentials of the image elements,
wherein image elements inside the cluster are stored in a cluster-member list, image elements on an outer-border of the cluster are stored in an outer-border list and image elements on an inner-border of the cluster are stored in an inner-border list; and
extracting a property of the object in the cutting planes, wherein the property is a circularity measure calculated using the image elements stored in the cluster-member, outer-border and inner-border lists.

12. The computer readable program storage device of claim 11, further comprising:
identifying whether the object is a polyp based on the circularity measure.

* * * * *